United States Patent
Suzuki et al.

(10) Patent No.: US 12,037,441 B2
(45) Date of Patent: Jul. 16, 2024

(54) SOLID CATALYST COMPONENT FOR OLEFIN POLYMERIZATION

(71) Applicant: SUMITOMO CHEMICAL COMPANY, LIMITED, Tokyo (JP)

(72) Inventors: Tetsuo Suzuki, Chiba (JP); Masaki Ito, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 18/315,116

(22) Filed: May 10, 2023

(65) Prior Publication Data

US 2023/0303730 A1    Sep. 28, 2023

Related U.S. Application Data (62) Division of application No. 17/215,538, filed on Mar. 29, 2021, now Pat. No. 11,680,115.

(30) Foreign Application Priority Data

Mar. 31, 2020    (JP) .................................. 2020-063455

(51) Int. Cl.
 *C08F 10/00*    (2006.01)
 *C08F 4/649*    (2006.01)

(52) U.S. Cl.
 CPC ............ *C08F 4/6494* (2013.01); *C08F 10/00* (2013.01); *C08F 2410/01* (2013.01); *C08F 2410/04* (2013.01)

(58) Field of Classification Search
 CPC ...................................................... C08F 10/00
 See application file for complete search history.

(56) References Cited

U.S. PATENT DOCUMENTS

2009/0234076 A1 *    9/2009    Yada .................... C08F 297/083
                                                     525/240

FOREIGN PATENT DOCUMENTS

| JP | 2004-182981 A | 7/2004 |
| JP | 2006-199738 A | 8/2006 |
| JP | 2010-229347 A | 10/2010 |
| WO | 2011130415 A1 | 10/2011 |
| WO | 2018/025862 A1 | 8/2018 |
| WO | 2018/230700 A1 | 12/2018 |

OTHER PUBLICATIONS

Non-Final Office Action issued on Nov. 20, 2023, in U.S. Appl. No. 18/315,056.

* cited by examiner

*Primary Examiner* — Catherine S Branch
(74) *Attorney, Agent, or Firm* — Meunier Carlin & Curfman LLC (57) ABSTRACT

To provide a solid catalyst component for olefin polymerization having a small amount of fine powder. A solid catalyst component for olefin polymerization containing a titanium atom, a magnesium atom, a halogen atom, and an internal electron donor. The solid catalyst component has an absolute difference in binding energy of 73.50 to 75.35 eV between a peak (1) with the binding energy of 457.00 to 459.00 eV and a peak (2) with the binding energy of 532.50 to 534.50 eV. The peak (1) and the peak (2) are within peak components measured by X-ray photoelectron spectroscopy, the peak (1) is obtained by waveform separation of peaks assigned to the 2p orbitals of the titanium atom, and the peak (2) is obtained by waveform separation of peaks assigned to the 1s orbital of an oxygen atom.

7 Claims, 2 Drawing Sheets

SOLID CATALYST COMPONENT FOR OLEFIN POLYMERIZATION

BACKGROUND OF THE DISCLOSURE

Field of the Disclosure

The present disclosure relates to a solid catalyst component for olefin polymerization, a catalyst for olefin polymerization, a method for producing an olefin polymer, a method for producing a solid catalyst component for olefin polymerization, and a precursor of a solid catalyst component for olefin polymerization.

Description of the Related Art

In the related art, many kinds of solid catalyst components containing a titanium atom, a magnesium atom, a halogen atom, and an internal electron donor have been proposed as a catalyst component for olefin polymerization. In order to reduce clogging of a polymerization device and fouling of a polymer on a wall surface of the polymerization device during olefin polymerization, it is desired that an amount of fine powder of a solid catalyst component for olefin polymerization should be small.

For example, WO 2018/025862 discloses a solid catalyst component for olefin polymerization produced by bringing a titanium halide compound solution containing a titanium halide compound and a solvent into contact with a magnesium compound to obtain a slurry containing a solid product while the titanium halide compound and the solvent contained in the titanium halide compound solution and a solvent contained in the slurry containing the solid product are used at a volume ratio in a specific range.

SUMMARY OF THE DISCLOSURE

Although the solid catalyst component for olefin polymerization disclosed in WO 2018/025862 provides a polymer with high stereoregularity, an amount of fine powder of the solid catalyst component for olefin polymerization is not yet satisfactory from a viewpoint of reducing clogging of a polymerization device and fouling of a polymer on a wall surface of the polymerization device.

The present disclosure has been made in light of the above problem, and an object of the present disclosure is to provide a solid catalyst component for olefin polymerization having a small amount of fine powder and a method for producing the same.

The present disclosure provides the following.

[1]
A solid catalyst component for olefin polymerization containing a titanium atom, a magnesium atom, a halogen atom, and an internal electron donor, the solid catalyst component having an absolute difference in binding energy of 73.50 to 75.35 eV between a peak (1) with the binding energy of 457.00 to 459.00 eV and a peak (2) with the binding energy of 532.50 to 534.50 eV, in which the peak (1) and the peak (2) are within peak components measured by X-ray photoelectron spectroscopy, the peak (1) is obtained by waveform separation of peaks assigned to the 2p orbitals of the titanium atom, and the peak (2) is obtained by waveform separation of peaks assigned to the 1s orbital of an oxygen atom.

[2]
The solid catalyst component for olefin polymerization according to [1], in which the absolute difference in binding energy is 75.05 to 75.35 eV.

[3]
The solid catalyst component for olefin polymerization according to [1] or [2], in which the internal electron donor is at least one selected from the group consisting of monoester compounds, aliphatic dicarboxylic acid ester compounds, aromatic dicarboxylic acid ester compounds, diol diester compounds, O-alkoxy ester compounds, and ether compounds.

[4]
The solid catalyst component for olefin polymerization according to [1] or [2], in which the internal electron donor is a β-alkoxy ester compound.

[5]
The solid catalyst component for olefin polymerization according to [1] or [2], in which the internal electron donor is ethyl 2-ethoxymethyl-3,3-dimethyibutanoate.

[6]
A catalyst for olefin polymerization containing the solid catalyst component for olefin polymerization according to any one of [1] to [5] and an organoaluminum compound.

[7]
A method for producing an olefin polymer, the method involving polymerizing of an olefin in the presence of the catalyst for olefin polymerization according to [6].

[8]
A method for producing a solid catalyst component for olefin polymerization containing a titanium atom, a magnesium atom, a halogen atom, and an internal electron donor, the method involving:

Step (I) of bringing a solution containing a titanium halide compound and a solvent into contact with metallic magnesium or a magnesium compound to obtain a slurry containing a solid product, in which $A_1$ calculated by the following Formula (1) is 0.3 to 1.6 in Step (I).

$$A_1 = n_1/60 \times d_1^{0.85} \tag{1}$$

(In Formula, $n_1$ represents revolutions per minute (rpm) of a stirrer blade, and $d_1$ represents a blade diameter (m) of the stirrer blade.)

[9]
The method for producing a solid catalyst component for olefin polymerization according to [8], further involving Step (II) of adding an internal electron donor to the slurry containing the solid product obtained in Step (I).

[10]
The method for producing a solid catalyst component for olefin polymerization according to [8] or [9], in which $A_2$ calculated by the following Formula (2) is 0.3 to 1.6 in Step (II).

$$A_2 = n_2/60 \times d_2^{0.85} \tag{2},$$

(In Formula, $n_2$ represents revolutions per minute (rpm) of the stirrer blade, and $d_2$ represents a blade diameter (m) of the stirrer blade.)

[11]
A method for producing a solid catalyst component for olefin polymerization according to any one of [8] to [10], in which the solid catalyst component for olefin polymerization has an absolute difference in binding energy of 73.50 to 75.35 eV between a peak (1) with the binding energy of 457.00 to 459.00 eV and a peak (2) with the binding energy of 532.50 to 534.50 eV, the peak (1) and the peak (2) are within peak components measured by X-ray photoelectron spectroscopy, the peak (1) is obtained by waveform separation of peaks assigned to the 2p orbitals of the titanium atom, and the peak (2) is obtained by waveform separation of peaks assigned to the is orbital of an oxygen atom.

[12]

The method for producing a solid catalyst component for olefin polymerization according to [11], in which the absolute difference in binding energy is 75.05 to 75.35 eV.

[13]

The method for producing a solid catalyst component for olefin polymerization according to any one of [8] to [12], in which the internal electron donor is at least one selected from the group consisting of monoester compounds, aliphatic dicarboxylic acid ester compounds, aromatic dicarboxylic acid ester compounds, diol diester compounds, β-alkoxy ester compounds, and ether compounds.

[14]

The method for producing a solid catalyst component for olefin polymerization according to any one of [8] to [13], in which the magnesium compound is a magnesium dialkoxide.

[15]

The method for producing a solid catalyst component for olefin polymerization according to [14], in which the magnesium dialkoxide is magnesium diethoxide. [16]

A precursor of a solid catalyst component for olefin polymerization, the precursor containing a titanium atom, a magnesium atom, and a halogen atom and having a mechanical strength of 3.50 to 7.00 MPa.

[17]

A method for producing a precursor of a solid catalyst component for olefin polymerization, the precursor containing a titanium atom, a magnesium atom, and a halogen atom and having a mechanical strength of 3.50 to 7.00 MPa, the method involving:

Step (I) of bringing a solution containing a titanium halide compound and a solvent into contact with metallic magnesium or a magnesium compound to obtain a slurry containing a solid product, in which $A_1$ calculated by the following Formula (1) is 0.3 to 1.6 in Step (I).

$$A_1 = n_1/60 \times d_1^{0.85} \quad (1)$$

(In Formula, $n_1$ represents revolutions per minute (rpm) of a stirrer blade, and $d_1$ represents a blade diameter (m) of the stirrer blade.)

According to the present disclosure, there is provided a solid catalyst component for olefin polymerization having a small amount of fine powder. With a small amount of fine powder, it is possible to remedy a clogged polymerization device or fouling of polymer on a wall surface of a polymerization device during olefin polymerization.

DETAILED DESCRIPTION OF THE PREFERRED EMBODIMENTS

Solid Catalyst Component for Olefin Polymerization
Method for Producing Solid Catalyst Component for Olefin Polymerization A solid catalyst component for olefin polymerization according to an embodiment of the present disclosure contains a titanium atom, a magnesium atom, a halogen atom, and an internal electron donor, the solid catalyst component having an absolute difference in binding energy of 73.50 to 75.35 eV between a peak (1) with the binding energy of 457.00 to 459.00 eV and a peak (2) with the binding energy of 532.50 to 534.50 eV, in which the peak (1) and the peak (2) are within peak components measured by X-ray photoelectron spectroscopy, the peak (1) is obtained by waveform separation of peaks assigned to the 2p orbitals of the titanium atom, and the peak (2) is obtained by waveform separation of peaks assigned to the is orbital of an oxygen atom.

Preferably, the absolute difference in binding energy is 75.05 to 75.35 eV. X-ray photoelectron spectroscopy is performed according to methods to be described in Examples below.

A method for producing a solid catalyst component for olefin polymerization according to an embodiment of the present disclosure is a method for producing a solid catalyst component for olefin polymerization containing a titanium atom, a magnesium atom, a halogen atom, and an internal electron donor, the method involving:

Step (I) of bringing a solution containing a titanium halide compound and a solvent into contact with metallic magnesium or a magnesium compound to obtain a slurry containing a solid product, in which $A_1$ calculated by the following Formula (1) is 0.3 to 1.6 in Step (I).

$$A_1 = n_1/60 \times d_1^{0.85} \quad (1)$$

(In Formula, $n_1$ represents revolutions per minute (rpm) of a stirrer blade, and $d_1$ represents a blade diameter (m) of the stirrer blade.)

The "solid catalyst component for olefin polymerization" herein represents a solid content which exists at least in toluene and serves as a catalyst for olefin polymerization when combined with an auxiliary catalyst for olefin polymerization such as an organoaluminum compound.

The titanium halide compound represents a compound containing halogen atoms and titanium atoms in which at least one halogen atom is bound to a titanium atom. Specific examples of the titanium halide compound include titanium tetrahalides such as titanium trichloride, titanium tetrachloride, titanium tetrabromide, and titanium tetraiodide; monoalkoxytitanium trihalides such as methoxytitanium trichloride, ethoxytitanium trichloride, n-propoxytitanium trichloride, n-butoxytitanium trichloride, and ethoxytitanium tribromide; dialkoxytitanium dihalides such as dimethoxytitanium dichloride, diethoxytitanium dichloride, diiso-propoxytitanium dichloride, di-n-propoxytitanium dichloride, and diethoxytitanium dibromide; and trialkoxytitanium monohalides such as trimethoxytitanium chloride, triethoxytitanium chloride, triiso-propoxytitanium chloride, tri-n-propoxytitanium chloride, and tri-n-butoxytitanium chloride. Among these examples, titanium tetrahalides or monoalkoxytitanium trihalides are preferable, titanium tetrahalides are more preferable, and titanium tetrachloride is still more preferable. One type of titanium halide compound may be used independently or two or more types may be used in combination.

Some or all of the titanium atoms in the solid catalyst component for olefin polymerization are derived from the titanium halide compound. Some or all of the halogen atoms in the solid catalyst component for olefin polymerization are derived from the titanium halide compound.

The magnesium compound may be any compound as long as the compound contains magnesium atoms. Specific examples of the magnesium compounds include those represented by the following Formulae (i) to (iii).

$$MgR^1_kX_{2-k} \quad \text{(i)}$$

$$Mg(OR^1)_mX_{3-m} \quad \text{(ii)}$$

$$MgX_2 \cdot nR^1OH \quad \text{(iii)}$$

(In Formulae, k is a number satisfying $0 \le k \le 2$; m is a number satisfying $0 < m \le 2$; n is a number satisfying $0 \le n \le 3$; $R^1$ is a $C_{1-20}$ hydrocarbyl group; and X is a halogen atom.)

Examples of $R^1$ in Formulae (i) to (iii) include alkyl, aralkyl, aryl, and alkenyl groups. Some or all of the hydrogen atoms contained in these groups may be substituted with halogen atoms or with hydrocarbyloxy, nitro, sulfonyl, and silyl groups. Examples of the alkyl group as $R^1$ include linear alkyl groups such as methyl, ethyl, n-propyl, n-butyl, n-pentyl, n-hexyl, n-heptyl, and n-octyl groups; branched alkyl groups such as iso-propyl, iso-butyl, tert-butyl, iso-pentyl, neopentyl, and 2-ethylhexyl groups; and cyclic alkyl groups such as cyclopropyl, cyclobutyl, cyclopentyl, cyclohexyl, cycloheptyl, and cyclooctyl groups. Preferred examples are $C_{1-20}$ linear alkyl and $C_{3-20}$ branched alkyl groups. Examples of the aralkyl group as $R^1$ include benzyl and phenethyl groups. Preferred examples are $C_{7-20}$ aralkyl groups. Examples of the aryl group as $R^1$ include phenyl, naphthyl, and tolyl groups. Preferred examples are $C_{6-20}$ aryl groups. Examples of the alkenyl group as $R^1$ include linear alkenyl groups such as vinyl, allyl, 3-butenyl, and 5-hexenyl groups; branched alkenyl groups such as iso-butenyl and 4-methyl-3-pentenyl groups; and cyclic alkenyl groups such as 2-cyclohexenyl and 3-cyclohexenyl groups. Preferred examples are $C_{2-20}$ linear alkenyl and $C_{3-20}$ branched alkenyl groups. $R^1$ in each Formula may be the same or different.

Examples of X in Formulae (i) to (iii) include chlorine, bromine, iodine, and fluorine atoms. Among these examples, a chlorine atom is preferable. X in each Formula may be the same or different.

Specific examples of the magnesium compound of Formulae (i) to (iii) include dialkylmagnesiums such as dimethyl magnesium, diethyl magnesium, diiso-propyl magnesium, dibutyl magnesium, dihexyl magnesium, dioctyl magnesium, ethyl butyl magnesium, dicyclohexyl magnesium, and butyl octyl magnesium; magnesium dialkoxides such as magnesium dimethoxide, magnesium diethoxide, magnesium dipropoxide, magnesium dibutoxide, magnesium dihexyloxide, magnesium dioctyloxide, and magnesium dicyclohexyloxide; alkylmagnesium halides such as methylmagnesium chloride, ethylmagnesium chloride, iso-propylmagnesium chloride, n-butylmagnesium chloride, t-butylmagnesium chloride, hexylmagnesium chloride, iso-butylmagnesium chloride, benzylmagnesium chloride, methylmagnesium bromide, ethylmagnesium bromide, iso-propylmagnesium bromide, n-butylmagnesium bromide, t-butylmagnesium bromide, hexylmagnesium bromide, iso-butylmagnesium bromide, benzylmagnesium bromide, methylmagnesium iodide, ethylmagnesium iodide, iso-propylmagnesium iodide, n-butylmagnesium iodide, t-butylmagnesium iodide, hexylmagnesium iodide, iso-butylmagnesium iodide, and benzylmagnesium iodide; alkoxymagnesium halides such as methoxymagnesium chloride, ethoxymagnesium chloride, isopropoxymagnesium chloride, butoxymagnesium chloride, and hexyloxymagnesium chloride; aryloxymagnesium halides such as phenyloxymagnesium chloride; and magnesium halides such as magnesium fluoride, magnesium chloride, magnesium bromide, and magnesium iodide.

Among these examples, magnesium halides or magnesium dialkoxides are preferable, and magnesium dialkoxides are particularly preferable. A preferred example of magnesium halides is magnesium chloride. Preferred examples of the magnesium dialkoxides are magnesium dialkoxides having $C_{1-20}$ alkyl groups, and more preferred examples are magnesium dialkoxides having $C_{1-10}$ alkyl groups. Among these examples, magnesium dimethoxide, magnesium diethoxide, magnesium dipropoxide, magnesium di(iso-propoxide), and magnesium dibutoxide are still more preferable. Furthermore, magnesium diethoxide is particularly preferable.

In regard to magnesium halides, commercially available products may be used without change. Alternatively, a solution obtained by dissolving a commercially available product in an alcohol may be dripped into a hydrocarbon liquid and then separated from the liquid to obtain a precipitate, and such a precipitate may be used as a magnesium halide. Furthermore, those produced by methods disclosed in U.S. Pat. No. 6,825,146, WO 1998/044009, WO 2003/000754, WO 2003/000757, and WO 2003/085006 may be used.

Examples of a method for producing magnesium dialkoxides include techniques disclosed in JP-A-4-368391, JP-A-3-74341, JP-A-8-73388, and WO 2013/058193 in which metallic magnesium is allowed to contact with an alcohol in the presence of a catalyst. Examples of the alcohol include methanol, ethanol, propanol, butanol, and octanol. Examples of the catalyst include halogens such as iodine, chlorine, and bromine; and magnesium halides such as magnesium iodide and magnesium chloride. Among these examples, iodine is preferable.

The magnesium compound may be supported on a carrier material. Examples of the carrier material include porous inorganic oxides such as $SiO_2$, $Al_2O_3$, MgO, $TiO_2$, and $ZrO_2$; and porous organic polymers such as polystyrene, styrene-divinylbenzene copolymer, styrene-ethylene glycol dimethacrylate copolymer, polymethyl acrylate, polyethyl acrylate, methyl acrylate-divinylbenzene copolymer, polymethyl methacrylate, methyl methacrylate-divinylbenzene copolymer, polyacrylonitrile, acrylonitrile-divinylbenzene copolymer, polyvinyl chloride, polyethylene, and polypropylene. Among these examples, porous inorganic oxides are preferable, and $SiO_2$ is more preferable.

In order to effectively immobilize the magnesium compound on the carrier material, it is preferable that the carrier material should be porous. It is more preferable that the carrier material should be a porous carrier material in which the total volume of 0.3 cm$^3$/g or more of pores having a pore radius of 10 to 780 nm determined by mercury intrusion porosimetry according to ISO 15901-1: 2005, and it is still more preferable that the total volume of such pores should be 0.4 cm$^3$/g or more. Furthermore, it is preferable that the carrier material should be a porous carrier material in which the total volume of pores having a pore radius of 10 to 780 nm is 25% or more and more preferably 30% or more with respect to the total volume of pores having a pore radius of 2 to 100 µm.

One type of magnesium compound may be used independently or two or more types may be used in combination. The magnesium compound to be brought into contact with the titanium halide compound may be a magnesium compound slurry containing the magnesium compound and a solvent within the scope which exerts effects according to the present disclosure. The magnesium compound is preferably a solvent-free compound and more preferably a powder.

Some or all of the magnesium atoms in the solid catalyst component for olefin polymerization are derived from the metallic magnesium or magnesium compound. In addition, some of the halogen atoms in the solid catalyst component for olefin polymerization may be derived from the magnesium compound.

The internal electron donor represents an organic compound capable of donating an electron pair to one or more metal atoms contained in the solid catalyst component for olefin polymerization. Specific examples of the internal electron donor include monoester compounds, dicarboxylic acid ester compounds (aliphatic dicarboxylic acid ester compounds or aromatic dicarboxylic acid ester compounds), diol diester compounds, β-alkoxy ester compounds, and ether compounds.

The monoester compounds represent organic compounds having one ester bond (—CO—O—) in a molecule. Preferred examples of the monoester compounds are aromatic carboxylic acid ester compounds and aliphatic carboxylic acid ester compounds. Examples of the aromatic carboxylic acid ester compounds include methyl benzoate, ethyl benzoate, propyl benzoate, butyl benzoate, pentyl benzoate, hexyl benzoate, octyl benzoate, methyl toluate, ethyl toluate, propyl toluate, butyl toluate, pentyl toluate, hexyl toluate, and octyl toluate. Examples of the aliphatic carboxylic acid ester compounds include methyl acetate, ethyl acetate, propyl acetate, butyl acetate, pentyl acetate, hexyl acetate, octyl acetate, methyl propionate, ethyl propionate, propyl propionate, butyl propionate, pentyl propionate, hexyl propionate, octyl propionate, methyl butyrate, ethyl butyrate, propyl butyrate, butyl butyrate, pentyl butyrate, hexyl butyrate, octyl butyrate, methyl valerate, ethyl valerate, propyl valerate, butyl valerate, pentyl valerate, hexyl valerate, octyl valerate, methyl caproate, ethyl caproate, propyl caproate, butyl caproate, pentyl caproate, hexyl caproate, octyl caproate, methyl enanthate, ethyl enanthate, propyl enanthate, butyl enanthate, pentyl enanthate, hexyl enanthate, octyl enanthate, methyl caprylate, ethyl caprylate, propyl caprylate, butyl caprylate, pentyl caprylate, hexyl caprylate, octyl caprylate, methyl pelargonate, ethyl pelargonate, propyl pelargonate, butyl pelargonate, pentyl pelargonate, hexyl pelargonate, octyl pelargonate, methyl caprate, ethyl caprate, propyl caprate, butyl caprate, pentyl caprate, hexyl caprate, octyl caprate, methyl laurate, ethyl laurate, propyl laurate, butyl laurate, pentyl laurate, hexyl laurate, octyl laurate, methyl myristate, ethyl myristate, propyl myristate, butyl myristate, pentyl myristate, hexyl myristate, octyl myristate, methyl palmitate, ethyl palmitate, propyl palmitate, butyl palmitate, pentyl palmitate, hexyl palmitate, octyl palmitate, methyl margarate, ethyl margarate, propyl margarate, butyl margarate, pentyl margarate, hexyl margarate, octyl margarate, methyl stearate, ethyl stearate, propyl stearate, butyl stearate, pentyl stearate, hexyl stearate, and octyl stearate.

The dicarboxylic acid ester compounds represent compounds having two ester bonds (—CO—O—) in a molecule and having a structure in which the two carboxyl groups of a dicarboxylic acid are esterified with monovalent alcohols. Preferred examples of the dicarboxylic acid ester compounds are aromatic dicarboxylic acid ester compounds and aliphatic dicarboxylic acid ester compounds. The aromatic dicarboxylic acid ester compounds represent compounds that can be synthesized from, for example, aromatic dicarboxylic acids or aromatic dicarboxylic acid dihalides and monovalent alcohols. Specific example of the aromatic dicarboxylic acid ester compounds include dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, diheptyl phthalate, di-n-octyl phthalate, di(2-ethylhexyl) phthalate, diisodecyl phthalate, dicyclohexyl phthalate, and diphenyl phthalate. The aliphatic dicarboxylic acid ester compounds represent compounds that can be synthesized from, for example, aliphatic dicarboxylic acids or aliphatic dicarboxylic acid dihalides and monovalent alcohols. Specific examples of the aliphatic dicarboxylic acid ester compounds include dimethyl ethanedioate, diethyl ethanedioate, dipropyl ethanedioate, dibutyl ethanedioate, dipentyl ethanedioate, dihexyl ethanedioate, dioctyl ethanedioate, dimethyl propanedioate, diethyl propanedioate, dipropyl propanedioate, dibutyl propanedioate, dipentyl propanedioate, dihexyl propanedioate, dioctyl propanedioate, dimethyl butanedioate, diethyl butanedioate, dipropyl butanedioate, dibutyl butanedioate, dipentyl butanedioate, dihexyl butanedioate, dioctyl butanedioate, dimethyl pentanedioate, diethyl pentanedioate, dipropyl pentanedioate, dibutyl pentanedioate, dipentyl pentanedioate, dihexyl pentanedioate, dioctyl pentanedioate, dimethyl hexanedioate, diethyl hexanedioate, dipropyl hexanedioate, dibutyl hexanedioate, dipentyl hexanedioate, dihexyl hexanedioate, dioctyl hexanedioate, dimethyl (E)-but-2-enedioate, diethyl (E)-but-2-enedioate, dipropyl (E)-but-2-enedioate, dibutyl (E)-but-2-enedioate, dipentyl (E)-but-2-enedioate, dihexyl (E)-but-2-enedioate, dioctyl (E)-but-2-enedioate, dimethyl (Z)-but-2-enedioate, diethyl (Z)-but-2-enedioate, dipropyl (Z)-but-2-enedioate, dibutyl (Z)-but-2-enedioate, dipentyl (Z)-but-2-enedioate, dihexyl (Z)-but-2-enedioate, dioctyl (Z)-but-2-enedioate, dimethyl cyclohexane-1,2-dicarboxylate, diethyl cyclohexane-1,2-dicarboxylate, dipropyl cyclohexane-1,2-dicarboxylate, dibutyl cyclohexane-1,2-dicarboxylate, dipentyl cyclohexane-1,2-dicarboxylate, dihexyl cyclohexane-1,2-dicarboxylate, dioctyl cyclohexane-1,2-dicarboxylate, dimethyl 1,2-cyclohexene-1,2-dicarboxylate, diethyl 1,2-cyclohexene-1,2-dicarboxylate, dipropyl 1,2-cyclohexene-1,2-dicarboxylate, dibutyl 1,2-cyclohexene-1,2-dicarboxylate, dipentyl 1,2-cyclohexene-1,2-dicarboxylate, dihexyl 1,2-cyclohexene-1,2-dicarboxylate, dioctyl 1,2-cyclohexene-1,2-dicarboxylate, dimethyl 3-methylcyclohexane-1,2-dicarboxylate, diethyl 3-methylcyclohexane-1,2-dicarboxylate, dipropyl 3-methylcyclohexane-1,2-dicarboxylate, dibutyl 3-methylcyclohexane-1,2-dicarboxylate, dipentyl 3-methylcyclohexane-1,2-dicarboxylate, dihexyl 3-methylcyclohexane-1,2-dicarboxylate, dioctyl 3-methylcyclohexane-1,2-dicarboxylate, dimethyl 3,6-dimethylcyclohexane-1,2-dicarboxylate, diethyl 3,6-dimethylcyclohexane-1,2-dicarboxylate, dipropyl 3,6-dimethylcyclohexane-1,2-dicarboxylate, dibutyl 3,6-dimethylcyclohexane-1,2-dicarboxylate, dipentyl 3,6-dimethylcyclohexane-1,2- dicarboxylate, dihexyl 3,6-dimethylcyclohexane-1,2-dicarboxylate, and dioctyl 3,6-dimethylcyclohexane-1,2-dicarboxylate.

The diol diester compounds represent compounds having two ester bonds (—CO—O—) in a molecule and having a structure in which the two hydroxyl groups of a diol esterify the carboxyl group of a monocarboxylic acid or a carboxyl group of a dicarboxylic acid. Examples of the diol diester compounds include 1,2-dibenzoatepropane, 1,2-diacetyloxypropane, 1,2-dibenzoatebutane, 1,2-diacetyloxybutane, 1,2-dibenzoatecyclohexane, 1,2-diacetyloxycyclohexane, 1,3-dibenzoatepropane, 1,3-diacetyloxypropane, 2,4-dibenzoatepentane, 2,4-diacetyloxypentane, 1,2-dibenzoatecyclopentane, 1,2-diacetyloxycyclopentane, 1,2-dibenzoate-4-tert-butyl-6-methylbenzene, 1,2-diacetyloxy-4-tert-butyl-6-methylbenzene, 1,3-dibenzoate-4-tert-butyl-6-methylbenzene, and 1,3-diacetyloxy-4-tert-butyl-6-methylbenzene.

The β-alkoxy ester compounds represent compounds having an alkoxycarbonyl group and an alkoxy group at β-position of the alkoxycarbonyl group. Specific example of the β-alkoxy ester compounds include methyl 2-methoxymethyl-3,3-dimethylbutanoate, ethyl 2-methoxymethyl-3,3-dimethylbutanoate, propyl 2-methoxymethyl-3,3-dimethylbutanoate, butyl 2-methoxymethyl-3,3-dimethylbutanoate, pentyl 2-methoxymethyl-3,3-dimethylbutanoate, hexyl 2-methoxymethyl-3,3-dimethylbutanoate, octyl 2-methoxymethyl-3,3-dimethylbutanoate, methyl 3-methoxy-2-phenylpropionate, ethyl 3-methoxy-2-phenylpropionate, propyl 3-methoxy-2-phenylpropionate, butyl 3-methoxy-2-phenylpropionate, pentyl 3-methoxy-2-phenylpropionate, hexyl 3-methoxy-2-phenylpropionate, octyl 3-methoxy-2-phenylpropionate, methyl 2-ethoxymethyl-3,3-dimethylbutanoate, ethyl 2-ethoxymethyl-3,3-dimethylbutanoate, propyl 2-ethoxymethyl-3,3-dimethylbutanoate, butyl 2-ethoxymethyl-3,3-dimethylbutanoate, pentyl 2-ethoxymethyl-3,3-dimethylbutanoate, hexyl 2-ethoxymethyl-3,3-dimethylbutanoate, octyl 2-ethoxymethyl-3,3-dimethylbutanoate, methyl 3-ethoxy-2-phenylpropionate, ethyl 3-ethoxy-2-phenylpropionate, propyl 3-ethoxy-2-phenylpropionate, butyl 3-ethoxy-2-phenylpropionate, pentyl 3-ethoxy-2-phenylpropionate, hexyl 3-ethoxy-2-phenylpropionate, octyl 3-ethoxy-2-phenylpropionate, methyl 2-propyloxymethyl-3,3-dimethylbutanoate, ethyl 2-propyloxymethyl-3,3-dimethylbutanoate, propyl 2-propyloxymethyl-3,3-dimethylbutanoate, butyl 2-propyloxymethyl-3,3-dimethylbutanoate, pentyl 2-propyloxymethyl-3,3-dimethylbutanoate, hexyl 2-propyloxymethyl-3,3-dimethylbutanoate, octyl 2-propyloxymethyl-3,3-dimethylbutanoate, methyl 3-propyloxy-2-phenylpropionate, ethyl 3-propyloxy-2-phenylpropionate, propyl 3-propyloxy-2-phenylpropionate, butyl 3-propyloxy-2-phenylpropionate, pentyl 3-propyloxy-2-phenylpropionate, hexyl 3-propyloxy-2-phenylpropionate, octyl 3-propyloxy-2-phenylpropionate, methyl 2-methoxybenzenecarboxylate, ethyl 2-methoxybenzenecarboxylate, propyl 2-methoxybenzenecarboxylate, butyl 2-methoxybenzenecarboxylate, pentyl 2-methoxybenzenecarboxylate, hexyl 2-methoxybenzenecarboxylate, octyl 2-methoxybenzenecarboxylate, methyl 2-ethoxybenzenecarboxylate, ethyl 2-ethoxybenzenecarboxylate, propyl 2-ethoxybenzenecarboxylate, butyl 2-ethoxybenzenecarboxylate, pentyl 2-ethoxybenzenecarboxylate, hexyl 2-ethoxybenzenecarboxylate, and octyl 2-ethoxybenzenecarboxylate.

Specific examples of the ether compounds include 1,2-dimethoxypropane, 1,2-diethoxypropane, 1,2-dipropyloxypropane, 1,2-dibutoxypropane, 1,2-di-tert-butoxypropane, 1,2-diphenoxypropane, 1,2-dibenzyloxypropane, 1,2-dimethoxybutane, 1,2-diethoxybutane, 1,2-dipropyloxybutane, 1,2-dibutoxybutane, 1,2-di-tert-butoxybutane, 1,2-diphenoxybutane, 1,2-dibenzyloxybutane, 1,2-dimethoxycyclohexane, 1,2-diethoxycyclohexane, 1,2-dipropyloxycyclohexane, 1,2-dibutoxycyclohexane, 1,2-di-tert-butoxycyclohexane, 1,2-diphenoxycyclohexane, 1,2-dibenzyloxycyclohexane, 1,3-dimethoxypropane, 1,3-diethoxypropane, 1,3-dipropyloxypropane, 1,3-dibutoxypropane, 1,3-di-tert-butoxypropane, 1,3-diphenoxypropane, 1,3-dibenzyloxypropane, 2,4-dimethoxypentane, 2,4-diethoxypentane, 2,4-dipropyloxypentane, 2,4-dibutoxypentane, 2,4-di-tert-butoxypentane, 2,4-diphenoxypentane, 2,4-dibenzyloxypentane, 1,2-dimethoxycyclopentane, 1,2-diethoxycyclopentane, 1,2-dipropyloxycyclopentane, 1,2-dibutoxycyclopentane, 1,2-di-tert-butoxycyclopentane, 1,2-diphenoxycyclopentane, 1,2-dibenzyloxycyclopentane, 9,9-bis(methoxymethyl) fluorene, 9,9-bis(ethoxymethyl) fluorene, 9,9-bis(propyloxymethyl) fluorene, 9,9-bis(butoxymethyl) fluorene, 9,9-bis-tert-butoxymethylfluorene, 9,9-bis(phenoxymethyl) fluorene, 9,9-bis(benzyloxymethyl) fluorene, 1,2-dimethoxybenzene, 1,2-diethoxybenzene, 1,2-dipropyloxybenzene, 1,2-dibutoxybenzene, 1,2-di-tert-butoxybenzene, 1,2-diphenoxybenzene, 1,2-dibenzyloxybenzene, tetrahydrofuran, dibutyl ether, and diethyl ether.

Furthermore, the internal electron donor disclosed in JP-A-2011-246699 may be exemplified.

Among these examples, dicarboxylic acid ester compounds, diol diester compounds, and R-alkoxy ester compounds are preferable. As an example, it is more preferable that the internal electron donor be a S-alkoxy ester compound, and it is still more preferable that the internal electron donor be ethyl 2-ethoxymethyl-3,3-dimethylbutanoate. One type of internal electron donor may be used independently or two or more types may be used in combination.

An amount of the titanium halide compound used in Step (I) is typically 0.01 mol to 100 mol, preferably 0.03 mol to 50 mol, and more preferably 0.05 mol to 30 mol, per 1 mol of the total magnesium atoms in the metallic magnesium or magnesium compound used in Step (I).

The solvent in Step (I) is preferably inert with respect to the solid product and the solid catalyst component for olefin polymerization produced in Step (I). Examples of the solvent include aliphatic hydrocarbons such as pentane, hexane, heptane, octane, and decane; aromatic hydrocarbons such as benzene, toluene, and xylene; alicyclic hydrocarbons such as cyclohexane, cyclopentane, methylcyclohexane, and decalin; halogenated hydrocarbons such as 1,2-dichloroethane and monochlorobenzene; and ether compounds such as diethyl ether, dibutyl ether, diisoamyl ether, and tetrahydrofuran. Among these examples, aromatic hydrocarbons or halogenated hydrocarbons are preferable, and toluene is more preferable. One type of solvent may be used independently or two or more types may be used in combination.

In the present disclosure, the contact between the titanium halide compound solution and the metallic magnesium or magnesium compound is typically carried out in an inert gas atmosphere such as nitrogen gas and argon gas. As a method of bringing these components into contact with each other to obtain a slurry containing a solid product, for example, the metallic magnesium or magnesium compound is added to the titanium halide compound solution.

In adding the metallic magnesium or magnesium compound to the titanium halide compound solution, the metallic magnesium or magnesium compound may be added at a time or may be separately added any number of times. Furthermore, the metallic magnesium or magnesium compound may be continuously added. In addition, the metallic magnesium or magnesium compound is preferably a powder. Alternatively, the metallic magnesium or magnesium compound may be a mixture of the metallic magnesium or magnesium compound and the solvent as long as the mixture provides the effect of the present disclosure.

As a method for bringing the components into contact with each other, known methods can be exemplified such as the slurry method and mechanical pulverization (for example, a method in which the components are brought into contact while being pulverized by a ball mill).

An amount of the titanium halide compound in the titanium halide compound solution is typically 0.001 to 50 mL, preferably 0.01 to 25 mL, more preferably 0.05 to 10 mL, and still more preferably 0.1 to 5.0 mL with respect to 1 mL of the solvent contained in the solution.

The temperature at which the titanium halide compound solution and the metallic magnesium or magnesium compound are brought into contact with each other is typically −20° C. to 50° C. and preferably −5° C. to 20° C. The time of contact is typically 0.01 to 48 hours, preferably 0.1 to 36 hours, and more preferably 1 to 24 hours.

In Step (I) of the method for producing a solid catalyst component for olefin polymerization according to an embodiment of the present disclosure, $A_1$ calculated by the following Formula (1) is 0.3 to 1.6.

$$A_1 = n_1/60 \times d_1^{0.85} \tag{1}$$

(In Formula, $n_1$ represents revolutions per minute (rpm) of a stirrer blade, and $d_1$ represents a blade diameter (m) of the stirrer blade.)

It is preferable that the method for producing a solid catalyst component for olefin polymerization according to an embodiment of the present disclosure should further involve Step (II) in which an internal electron donor is added to the slurry containing the solid product obtained in Step (I).

In Step (II), $A_2$ calculated by the following Formula (2) is preferably 0.3 to 1.6.

$$A_2 = n_2/60 \times d_2^{0.85} \tag{2}$$

(In Formula, $n_2$ represents revolutions per minute (rpm) of the stirrer blade, and $d_2$ represents a blade diameter (m) of the stirrer blade.)

In Step (I) and Step (II), the revolutions per minute $n_1$ (rpm) and $n_2$ (rpm) of the stirrer blade are not particularly limited but are independently, for example, in a range of 10 rpm to 10,000 rpm. The diameters $d_1$ (m) and $d_2$ (m) of the stirrer blade are not particularly limited but are independently, for example, within a range of 0.01 m to 1 m. The stirrer blade is not particularly limited in shape and may have a shape of, for example, paddle, propeller, turbine, or anchor.

The shape of a reaction reactor used in Step (I) and Step (II) is not particularly limited and has, for example, a cylindrical shape with a circular base (or a dish-shaped base) or an elliptical cylinder shape with an elliptical base. The reaction reactor may be provided with a baffle. The baffle is not particularly limited in shape but may have, for example, one to six flat plates. A ratio of the blade diameter of the stirrer blade to the inner diameter of the reaction reactor is not particularly limited but is for example, 0.3 to 0.9 and preferably 0.1 to 0.9.

The internal electron donor may be added at any timing. For example, the internal electron donor may be added to the reactor prior to Step (I) or may be mixed in the titanium halide compound solution or may be mixed in the metallic magnesium or magnesium compound. Alternatively, the internal electron donor may be mixed in Step (I) or may be added to the slurry containing the solid product after Step (I).

In the production method according to an embodiment of the present disclosure, an amount of the internal electron donor used is typically 0.001 mol to 100 mol and preferably 0.01 mol to 10 mol per 1 mol of the total magnesium atoms in the metallic magnesium or magnesium compound used in Step (I).

In an embodiment, in order to enhance particle properties, it is preferable to add the internal electron donor to the slurry containing the solid product after Step (I). In other words, the production method according to an embodiment of the present disclosure preferably involves Step (II) in which the internal electron donor is added to the slurry containing the solid product. Typically, Step (I) and Step (II) are carried out while the components are stirred.

Regardless of the timing of adding the internal electron donor, the temperature at the time of reacting the solid product and the internal electron donor is typically −30° C. to 150° C., preferably −20° C. to 135° C., and more preferably −10° C. to 120° C. The time of reaction is typically 0.1 to 12 hours and preferably 0.5 to 10 hours. The reaction of the solid product and the internal electron donor is typically carried out in an atmosphere of an inert gas such as nitrogen gas and argon gas.

A precursor of a solid catalyst component for olefin polymerization according to an embodiment of the present disclosure contains a titanium atom, a magnesium atom, and a halogen atom and has a mechanical strength of 3.50 to 7.00 MPa.

The mechanical strength is preferably 4.00 to 7.00 MPa.

The measurement of the mechanical strength is carried out according to a method described in the following Examples.

A method for producing the precursor of a solid catalyst component for olefin polymerization according to an embodiment of the present disclosure involves Step (I) of bringing a solution containing a titanium halide compound and a solvent into contact with metallic magnesium or a magnesium compound to obtain a slurry containing a solid product. In Step (I), $A_1$ calculated by the following Formula (1) is 0.3 to 1.6.

$$A_1 = n_1/60 \times d_1^{0.85} \tag{1}$$

(In Formula, $n_1$ represents revolutions per minute (rpm) of a stirrer blade, and $d_1$ represents a blade diameter (m) of the stirrer blade.)

This Step (I) may be the same as Step (I) in the aforementioned method for producing a solid catalyst component for olefin polymerization.

On completion of the reaction, the obtained solid may be used as a solid catalyst component for olefin polymerization. Alternatively, the obtained solid may be used as a precursor and once again brought into contact with at least one of the titanium halide compound, the metallic magnesium or magnesium compound, and the internal electron donor to obtain another solid, and the another solid may be used as a solid catalyst component for olefin polymerization. The production method according to an embodiment of the present disclosure involves Step (III) of bringing the obtained precursor into contact with at least one of the titanium halide compound, the metallic magnesium or magnesium compound, and the internal electron donor.

The solid catalyst component for olefin polymerization or the precursor is preferably washed with a solvent in order to remove unwanted substances. The solvent is preferably inert with respect to the precursor or the solid catalyst component for olefin polymerization. Examples of the solvent include aliphatic hydrocarbons such as pentane, hexane, heptane, and octane; aromatic hydrocarbons such as benzene, toluene, and xylene; alicyclic hydrocarbons such as cyclohexane and cyclopentane; and halogenated hydrocarbons such as 1,2-dichloroethane and monochlorobenzene. Among these examples, aromatic hydrocarbons and halogenated hydrocarbons are particularly preferable. An amount of solvent used for washing in each contact is, for example, 0.1 mL to 1000 mL per 1 g of the solid catalyst component for olefin polymerization or the precursor. A preferred amount of solvent is 1 mL to 100 mL per 1 g. Cleaning is typically performed 1 to 10 times in each contact. The cleaning temperature is typically −50 to 150° C., preferably 0 to 140° C., and more preferably 20 to 135° C. The time of washing is preferably 1 to 300 minutes and more preferably 2 to 150 minutes.

Step (III) is preferably carried out in a solvent. The solvent in Step (III) is similar to that used in Step (I). When the precursor is brought into contact with the titanium halide compound in Step (III), an amount of the titanium halide compound is typically 0.001 to 50 mL/mL of solvent, preferably 0.01 to 25 mL/mL of solvent, more preferably 0.05 to 10 mL/mL of solvent, and still more preferably 0.1 to 5.0 mL/mL of solvent. When the precursor is brought into contact with the metallic magnesium or magnesium compound in Step (III), an amount of the metallic magnesium or magnesium compound is typically 0.01 to 10 g/mL of solvent and preferably 0.1 to 1.0 g/mL of solvent. When the precursor is brought into contact with the internal electron donor in Step (III), an amount of the internal electron donor is typically 0.001 to 100 mol and preferably 0.01 to 10 mol per 1 mol of the total magnesium atoms in the metallic magnesium or magnesium compound used in Step (I) and Step (III).

The types of titanium halide compound, metallic magnesium or magnesium compound, and internal electron donor in Step (III) may be the same as or different from those in Step (I) or Step (II).

The temperature in Step (III) is typically −30° C. to 150° C., preferably −20° C. to 130° C., and more preferably −10° C. to 120° C. The time of contact is typically 0.1 to 12 hours and preferably 1 to 8 hours. In the present disclosure, the contact between the precursor and at least one of the titanium halide compound, the metallic magnesium or magnesium compound, and the internal electron donor is typically carried out in an inert gas atmosphere such as nitrogen gas and argon gas. Step (III) may be performed once or may be repeated several times.

On completion of the reaction, the obtained solid can be used as a solid catalyst component for olefin polymerization. The solid catalyst component for olefin polymerization is preferably washed with a solvent in a similar manner to the above procedure. Furthermore, the solid catalyst component for olefin polymerization may be dried after washing (for example, heat drying).

In one example, the titanium atom content in the solid catalyst component for olefin polymerization is typically 0.1 to 10% by weight and preferably 0.5 to 5.0% by weight.

In one example, the internal electron donor content in the solid catalyst component for olefin polymerization is typically 1 to 50% by weight and preferably 5 to 40% by weight.

In one example, the alkoxy group content in the solid catalyst component for olefin polymerization is typically 10% by weight or less and preferably 5% by weight or less.

Catalyst for Olefin Polymerization

In an embodiment, a catalyst for olefin polymerization can be produced when the solid catalyst component for olefin polymerization according to an embodiment of the present disclosure is brought into contact with an organoaluminum compound by, for example, a known method. In another embodiment, a catalyst for olefin polymerization can be produced when the solid catalyst component for olefin polymerization according to an embodiment of the present disclosure is brought into contact with an organoaluminum compound and an external electron donor.

Therefore, a catalyst for olefin polymerization according to an embodiment of the present disclosure contains the solid catalyst component for olefin polymerization according to an embodiment of the present disclosure and an organoaluminum compound. Furthermore, a catalyst for olefin polymerization according to another embodiment of the present disclosure contains the solid catalyst component for olefin polymerization according to an embodiment of the present disclosure, an organoaluminum compound, and an external electron donor.

The organoaluminum compound used in the present disclosure is a compound having one or more carbon-aluminum bonds, and specific examples thereof include the compounds disclosed in JP-A-10-212319. Specifically, preferred examples are trialkylaluminum, a mixture of trialkylaluminum and dialkylaluminum halide, or aikylalumoxane, and more preferred examples are triethylaluminum, triiso-butylaluminum, trihexylaluminum, trioctylaluminum, diethylaluminum chloride, a mixture of triethylaluminum and diethylaluminum chloride, or tetraethyldialumoxane.

Examples of the external electron donor used in the present disclosure include the compounds disclosed in JP-B-2950168, JP-A-2006-96936, JP-A-2009-173870, and JP-A-2010-168545. Specifically, preferred examples are oxygen-containing compounds or nitrogen-containing compounds. Examples of the oxygen-containing compounds include alkoxy silicon compounds, ethers, esters, and ketones.

Specifically, preferred examples are alkoxy silicon compounds or ethers.

An alkoxy silicon compound as the external electron donor is preferably a compound represented by any of the following Formulae (iv) to (vii).

$R^2_h Si(OR^3)_{4-h}$ (iv)

$Si(OR^4)_3(NR^5R^6)$ (v)

$Si(OR^4)_3(NR^7)$ (vi)

$Si(OR^4)_2(NR^7)_2$ (vii)

[In Formulae, $R^2$ is a $C_{1-20}$ hydrocarbyl group or a hydrogen atom; $R^3$ is a $C_{1-20}$ hydrocarbyl group; and h is an integer satisfying 0≤h<4. When one or both of $R^2$ and $R^3$ present in plural, the plurality of $R^2$ and $R^3$ may be the same or different. $R^4$ is a $C_{1-6}$ hydrocarbyl group; $R^5$ and $R^6$ are hydrogen atoms or $C_{1-12}$ hydrocarbyl groups; and $NR^7$ is a $C_{5-20}$ cyclic amino group.]

Examples of the hydrocarbyl groups as $R^2$ and $R^3$ in Formula (iv) include alkyl, aralkyl, aryl, and alkenyl groups. Examples of the alkyl groups as $R^2$ and $R^3$ include linear alkyl groups such as methyl, ethyl, n-propyl, n-butyl, n-pentyl, n-hexyl, n-heptyl, and n-octyl groups; branched alkyl groups such as iso-propyl, iso-butyl, tert-butyl, iso-pentyl, neopentyl, and 2-ethylhexyl groups; and cyclic alkyl groups such as cyclopropyl, cyclobutyl, cyclopentyl, cyclohexyl, cycloheptyl, and cyclooctyl groups. Preferable examples are $C_{1-20}$ linear, branched, or cyclic alkyl groups. Examples of the aralkyl groups as $R^2$ and $R^3$ include benzyl and phenethyl groups. Preferred examples are $C_{7-20}$ aralkyl groups. Examples of the aryl group as $R^2$ and $R^3$ include phenyl, tolyl, and xylyl groups. Preferable examples are $C_{6-20}$ aryl groups. Examples of the alkenyl groups as $R^2$ and $R^3$ include linear alkenyl groups such as vinyl, allyl, 3-butenyl, and 5-hexenyl groups; branched alkenyl groups such as iso-butenyl and 5-methyl-3-pentenyl group; and cyclic alkenyl groups such as 2-cyclohexenyl and 3-cyclohexenyl groups. Preferred examples are $C_{2-10}$ alkenyl groups.

Specific examples of the alkoxy silicon compound represented by Formula (iv) include cyclohexylmethyldimethoxysilane, cyclohexylethyldimethoxysilane, diiso-propyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, dicyclohexyldimethoxysilane, tetraethoxysilane, methyltziethoxysilane, ethyltriethoxysilane, iso-butyltriethoxysilane, vinyltriethoxysilane, sec-butyltriethoxysilane, cyclohexyltriethoxysilane, and cyclopentyltriethoxysilane.

Examples of the hydrocarbyl group as $R^4$ in Formulae (v), (vi), and (vii) include alkyl and alkenyl groups. Examples of the alkyl group as $R^4$ include linear alkyl groups such as methyl, ethyl, n-propyl, n-butyl, n-pentyl, and n-hexyl groups; branched alkyl groups such as iso-propyl, iso-butyl, tert-butyl, iso-pentyl, and neopentyl groups; and cyclic alkyl groups such as cyclopropyl, cyclobutyl, cyclopentyl, and cyclohexyl groups. Preferable examples are $C_{1-6}$ linear alkyl groups. Examples of the alkenyl group as $R^4$ include linear alkenyl groups such as vinyl, allyl, 3-butenyl, and 5-hexenyl groups; branched alkenyl groups such as iso-butenyl and 5-methyl-3-pentenyl groups; and cyclic alkenyl groups such as 2-cyclohexenyl and 3-cyclohexenyl groups. Preferred examples are $C_{2-6}$ linear alkenyl groups, and particularly preferred examples are methyl and ethyl groups.

Examples of the hydrocarbyl groups as $R^5$ and $R^6$ in Formula (v) include alkyl and alkenyl groups. Examples of the alkyl group as $R^5$ and $R^4$ include linear alkyl groups such as methyl, ethyl, n-propyl, n-butyl, n-pentyl, and n-hexyl groups; branched alkyl groups such as iso-propyl, iso-butyl, tert-butyl, iso-pentyl, and neopentyl groups; and cyclic alkyl groups such as cyclopropyl, cyclobutyl, cyclopentyl, and cyclohexyl groups. Preferable examples are $C_{1-6}$ linear alkyl groups. Examples of the alkenyl groups as $R^5$ and $R^6$ include linear alkenyl groups such as vinyl, allyl, 3-butenyl, and 5-hexenyl groups; branched alkenyl groups such as iso-butenyl and 5-methyl-3-pentenyl groups; and cyclic alkenyl groups such as 2-cyclohexenyl and 3-cyclohexenyl groups. Preferred examples are $C_{2-6}$ linear alkenyl groups, and particularly preferred examples are methyl and ethyl groups.

Specific examples of the alkoxy silicon compound represented by Formula (v) include dimethylaminotrimethoxysilane, diethylaminotrimethoxysilane, di-n-propylaminotrimethoxysilane, dimethylaminotriethoxysilane, diethylaminotriethoxysilane, di-n-propylaminotriethoxysilane, methylethylaminotriethoxysilane, methyl-n-propylaminotriethoxysilane, tert-butylaminotriethoxysilane, diiso-propylaminotriethoxysilane, and methyl iso-propylaminotriethoxysilane.

Examples of the cyclic amino group as $NR^1$ in Formulae (vi) and (vii) include perbydroquinolino, perhydroisoquinolino, 1,2,3,4-tetrahydroquinolino, 1,2,3,4-tetrahydroisoquinolino, and octamethyleneimino groups.

Specific examples of the alkoxy silicon compound represented by Formulae (vi) and (vii) include perhydroquinolinotriethoxysilane, perhydroisoquinolinotriethoxysilane, 1,2,3,4-tetrahydroquinolinotriethoxysilane, 1,2,3,4-tetrahydroisoquinolinotriethoxysilane, and octamethyleneiminotriethoxysilane.

An ether as the external electron donor is preferably a cyclic ether compound. The cyclic ether compound is a heterocyclic compound having at least one —C—O—C— bond in the ring structure and more preferably at least one —C—O—C—O—C— bond in the ring structure. Particularly, 1,3-dioxolane or 1,3-dioxane is preferable.

One type of external electron donor may be used independently or two or more types may be used in combination.

A method of bringing the solid catalyst component for olefin polymerization into contact with the organoaluminum compound and the external electron donor is not particularly limited as long as the method produces a catalyst for olefin polymerization. A contact is carried out in the presence or absence of a solvent. The contacted mixtures may be fed in a polymerization reactor, or each component may be separately fed to a polymerization reactor and brought into contact with each other in the polymerization reactor. Alternatively, a contacted mixture of any two components and the remaining components may be fed separately to a polymerization reactor and brought into contact with each other in the polymerization reactor.

An amount of the organoaluminum compound used is typically 0.01 to 1000 µmol and preferably 0.1 to 500 µmol per 1 mg of the solid catalyst component for olefin polymerization.

An amount of the external electron donor used is typically 0.0001 to 1000 µmol, preferably 0.001 to 500 µmol, and more preferably 0.01 to 150 µmol, per 1 mg of the solid catalyst component for olefin polymerization.

Method for Producing Olefin Polymer

A method for producing an olefin polymer according to an embodiment of the present disclosure is to polymerize an olefin in the presence of the catalyst for olefin polymerization according to an embodiment of the present disclosure.

Examples of the olefin include ethylene and α-olefins having 3 or more carbon atoms. Examples of the α-olefins include linear monoolefins such as propylene, 1-butene, 1-pentene, 1-hexene, 1-heptene, 1-octene, and 1-decene; branched monoolefins such as 3-methyl-1-butene, 3-methyl-1-pentene, and 4-methyl-1-pentene; cyclic monoolefins such as vinylcyclohexane; and combinations of two or more of these examples. Specifically, the olefin is preferably homopolymerization of ethylene or propylene or copolymerization of a plurality of types of olefins containing ethylene or propylene as the main component. The combination of the aforementioned plurality of types of olefins may include a combination of two or more types of olefins or a combination of an olefin and a compound having a polyunsaturated bond such as a conjugated diene or an unconjugated diene.

An olefin polymer produced by the method for producing an olefin polymer according to an embodiment of the present disclosure is preferably an ethylene homopolymer, a propylene homopolymer, a 1-butene homopolymer, a 1-pentene homopolymer, a 1-hexene homopolymer, an ethylene-propylene copolymer, an ethylene-1-butene copolymer, an ethylene-1-hexene copolymer, a propylene-1-butene copolymer, a propylene-1-hexene copolymer, an ethylene-propylene-1-butene copolymer, an ethylene-propylene-1-hexene copolymer, or a polymer obtained by multi-stage polymerization of thereof.

In some cases, a method for forming the catalyst for olefin polymerization according to an embodiment of the present disclosure preferably involves the following steps:

(i) In the presence of the solid catalyst component for olefin polymerization and the organoaluminum compound, a small amount of olefin (which is the same or different from the olefin used in the primary polymerization (typically referred to as main polymerization)) is polymerized (alternatively, a chain transfer agent such as hydrogen may be used to adjust the molecular weight of the resulting olefin polymer, or an external electron donor may be used) to produce a catalyst component having a surface covered with the olefin polymer (note that this polymerization is typically referred to as prepolymerization, and therefore, the catalyst component is typically referred to as prepolymerized catalyst component.)

(ii) The prepolymerized catalyst component is brought into contact with the organoaluminum compound and the external electron donor.

Prepolymerization is preferably slurry polymerization using inert hydrocarbons such as propane, butane, isobutane, pentane, isopentane, hexane, heptane, octane, cyclohexane, benzene, and toluene as solvents.

An amount of the organoaluminum compound used in Step (i) is typically 0.5 mol to 700 mol, preferably 0.8 mol to 500 mol, particularly preferably 1 mol to 200 mol, per 1 mol of the titanium atoms in the solid catalyst component used in Step (i).

An amount of the olefin to be prepolymerized is typically 0.01 g to 1000 g, preferably 0.05 g to 500 g, particularly preferably 0.1 g to 200 g per 1 g of the solid catalyst component for olefin polymerization used in Step (i).

A slurry concentration of the solid catalyst component for olefin polymerization in the slurry polymerization of Step (i) is preferably 1 to 500 g—solid catalyst component for olefin polymerization/liter—solvent, particularly preferably 3 to 300 g—solid catalyst component for olefin polymerization/liter—solvent.

The temperature of the prepolymerization is preferably −20° C. to 100° C. and particularly preferably 0° C. to 80° C. During the prepolymerization, the olefin in the gas phase preferably has a partial pressure of 0.01 MPa to 2 MPa and particularly preferably 0.1 MPa to 1 MPa. However, these ranges do not apply to olefins which are in liquid form at the pressure and temperature of prepolymerization. The time of prepolymerization is preferably 2 minutes to 72 hours.

The following methods (1) and (2) are examples of how the solid catalyst component for olefin polymerization, the organoaluminum compound, and the olefin are fed to a polymerization reactor during the prepolymerization:

(1) After feeding the solid catalyst component for olefin polymerization and the organoaluminum compound, the olefin is fed.

(2) After feeding the solid catalyst component for olefin polymerization and the olefin, the organoaluminum compound is fed.

The following methods (1) and (2) are examples of how the olefin is fed to the polymerization reactor during the prepolymerization:

(1) The olefin is sequentially fed to the polymerization reactor while the pressure inside the polymerization reactor is kept at a predetermined level.

(2) A predetermined amount of the olefin is collectively fed to the polymerization reactor.

An amount of the external electron donor used in the prepolymerization is typically 0.01 mol to 400 mol, preferably 0.02 mol to 200 mol, particularly preferably 0.03 mol to 100 mol, with respect to 1 mol of the titanium atoms contained in the solid catalyst component for olefin polymerization and is typically 0.003 mol to 5 mol, preferably 0.005 mol to 3 mol, particularly preferably 0.01 mol to 2 mol, with respect to 1 mol of the organoaluminum compound.

The following methods (1) and (2) are examples of how the external electron donor is fed to the polymerization reactor during the prepolymerization:

(1) The external electron donor is independently fed to the polymerization reactor (2) A contacted product of the external electron donor and the organoaluminum compound is fed to the polymerization reactor.

An amount of the organoaluminum compound used in the main polymerization is typically 1 mol to 1000 mol and particularly preferably 5 mol to 600 mol per 1 mol of the titanium atoms in the solid catalyst component for olefin polymerization.

When an external electron donor is used in the main polymerization, the amount of the external electron donor used is typically 0.1 mol to 2000 mol, preferably 0.3 mol to 1000 mol, particularly preferably 0.5 mol to 800 mol with respect to 1 mol of the titanium atoms contained in the solid catalyst component for olefin polymerization and is typically 0.001 mol to 5 mol, preferably 0.005 mol to 3 mol, and particularly preferably 0.01 mol to 1 mol with respect to 1 mol of the organoaluminum compound.

The temperature of the main polymerization is typically −30° C. to 300° C. and preferably 20° C. to 180° C. The polymerization pressure is not particularly limited but typically normal pressure to 10 MPa and preferably about 200 kPa to 5 MPa from an industrial and economical point of view. The polymerization is of batch type or continuous type. Examples of the polymerization include slurry polymerization and solution polymerization using inert hydrocarbons such as propane, butane, isobutane, pentane, hexane, heptane, and octane as solvents. Other examples of the polymerization include bulk polymerization using olefins which are in liquid form at the temperature of polymerization as media and include gas-phase polymerization using a fluidized bed.

Chain transfer agents (for example, hydrogen or alkyl zincs such as dimethylzinc and diethylzinc) may be used to adjust the molecular weight of a polymer to be obtained in the main polymerization.

According to an embodiment of the present disclosure, it is possible to reduce clogging of a polymerization device and fouling of a polymer on a wall surface of the polymerization device during olefin polymerization.

Examples are now shown to describe embodiments of the present disclosure in more detail.

EXAMPLES

Hereinafter, the present disclosure will be described more specifically with reference to Examples and Comparative Examples, but the present disclosure is not limited to the following Examples.

X-ray photoelectron spectroscopy of solid catalyst component for olefin polymerization According to ISO15472: 2001, X-ray photoelectron spectroscopy was performed to measure peaks of a solid catalyst component for olefin polymerization assigned to the 2p orbitals of titanium atoms and the 1s orbital of oxygen atoms. The above peaks were obtained under the following conditions using a Quantera SXM (available from ULVAC-PHI) as a measuring device. In measuring the peaks, charges were corrected so that the binding energy of the carbon is orbital of the C—C bond was 284.6 eV.

Measurement Conditions
Light source: Monochromatic AlK α-ray (1486.6 eV)
Tube current: 3 mA
Tube voltage: 15 kV Among the peaks assigned to the 2p orbitals of the measured titanium atoms, peak components including a peak with the binding energy of 457.00 eV or more and 459.00 eV or less and peak components including a peak with the binding energy over 459.00 eV and 460.00 eV or less were subjected to waveform separation based on multiple Gaussian and Lorentzian curves using the half width and intensity as fitting parameters. Among the peak components assigned to the 2p orbitals of the obtained titanium atoms, the binding energy of the peak (1) where the binding energy is in the range of 457.00 eV or more and 459.00 eV or less was determined.

Among the peaks assigned to the 1s orbital of the measured oxygen atoms, peak components including a peak with the binding energy of 532.50 eV or more and 534.50 eV or less and peak components including a peak with the binding energy of 530.00 eV or more and 532.50 eV or less were subjected to waveform separation based on multiple Gaussian and Lorentzian curves using the half width and intensity as fitting parameters. Among the peak components assigned to the 1s orbital of the obtained oxygen atoms, the binding energy of the peak (2) where the binding energy is in the range of 532.50 eV or more and 534.50 eV or less was determined.

The binding energy of the peak (1) was subtracted from the binding energy of the peak (2) to obtain an absolute difference in binding energy.

<Measurement of Amount of Fine Powder ($Cm^2/g$) in Solid Catalyst Component for Olefin Polymerization>

An amount of fine powder in the solid catalyst component for olefin polymerization was measured by gravity sedimentation. After the solid catalyst component for olefin polymerization was dispersed in toluene, the resultant was shaken, and then, allowed to stand. An amount of fine powder was determined from a difference between specific absorbance at 100 seconds and specific absorbance at 600 seconds after still standing (wavelength: 500 nm, specific absorbance at 100 seconds—specific absorbance at 600 seconds). The specific absorbance is calculated by the following Formula.

Specific absorbance=Absorbance at each time/
(Weight of solid catalyst component for olefin
polymerization (g)/Volume of toluene ($cm^3$))/
Optical path length (cm)

An ultraviolet-visible near-infrared spectrophotometer V-650 available from JASCO Corporation was used for the measurement of specific absorbance.

With a small amount of fine powder in the solid catalyst component for olefin polymerization, it is possible to remedy (reduce) clogging of a polymerization device and fouling of a polymer on a wall surface of the polymerization device during olefin polymerization.

Measurement method of mechanical strength (MPa) of precursor of solid catalyst component for olefin polymerization A mechanical strength (MPa) is calculated by the following Formula using a force P (mN) and a particle diameter d (μm) when a load is applied to particles to cause breakage (crush).

Mechanical strength=$2.48 \times P/(\pi \times d \times d)$

As a device for measuring a mechanical strength, a micro compression tester MCT-210 series available from Shimadzu Corporation was used. Using a microscope, one grain of precursor of the solid catalyst component for olefin polymerization was collected as a test particle, and a particle size d of the test particle was measured. A load speed was set to 4.44 mN/sec, and the mechanical strength was measured under a nitrogen gas atmosphere and at a dew point of −40° C. or lower. This measurement was performed on 10 or more grains of precursor of the solid catalyst component for olefin polymerization to determine the average value of the mechanical strength. Values exceeding 2σ from the average value were regarded as abnormal values and removed.

Example 1

Synthesis of Solid Catalyst Component 1 for Olefin Polymerization

Step (I):

A gas inside a flask equipped with a stirrer was displaced with nitrogen gas. Then, toluene (171 mL) and titanium tetrachloride (108 mL) were put in the flask and stirred to obtain a toluene solution containing titanium tetrachloride. Then, after the temperature inside the flask was adjusted to 0° C., magnesium diethoxide (8.9 g) was put in the flask in four additions on a 30-minute basis while being stirred under conditions of $n_1$: 230 rpm, $d_1$: 0.054 m, and $A_1$: 0.32. Then, the temperature inside the flask was kept at 0° C. for 90 minutes. Then, ethyl 2-ethoxymethyl-3,3-dimethylbutanoate (2.7 mL) and toluene (32 mL) were put in the flask. After the temperature inside the flask was adjusted to 60° C., ethyl 2-ethoxymethyl-3,3-dimethylbutanoate (14.1 mL) was put in the flask, and the temperature inside the flask was adjusted to 110° C., and then, the mixture was stirred at 110° C. for 3 hours. The resulting slurry was subjected to solid-liquid separation to obtain a solid. The solid obtained was washed with toluene at 100° C. to yield a solid product.

Step (II):

The inside of a flask equipped with a stirrer is displaced with nitrogen gas. After the solid product obtained in Step (I) and toluene (143 mL) were put in the flask, the mixture was stirred at room temperature under conditions of $n_2$: 230 rpm, $d_2$: 0.054 m, and $A_2$: 0.32 to obtain slurry. After the temperature inside the flask was adjusted to 70° C., titanium tetrachloride (71 mL) was put in the flask, and subsequently, ethyl 2-ethoxymethyl-3,3-dimethylbutanoate (3.4 mL) was added. After the temperature inside the flask was adjusted to 105° C., the mixture was stirred at 105° C. for an hour. The resulting mixture was subjected to solid-liquid separation with a filter having a mesh size of 20 to 30 μm (G3 filter compliant to JIS R3503-1994) to obtain a solid. The solid obtained was washed with toluene at 60° C., and then, with hexane at room temperature. The solid obtained was dried to yield a solid catalyst component 1 for olefin polymerization. The obtained solid catalyst component 1 for olefin polymerization had a yield of 100% based on an amount of magnesium fed. Table 1 shows the results.

Figure 1:
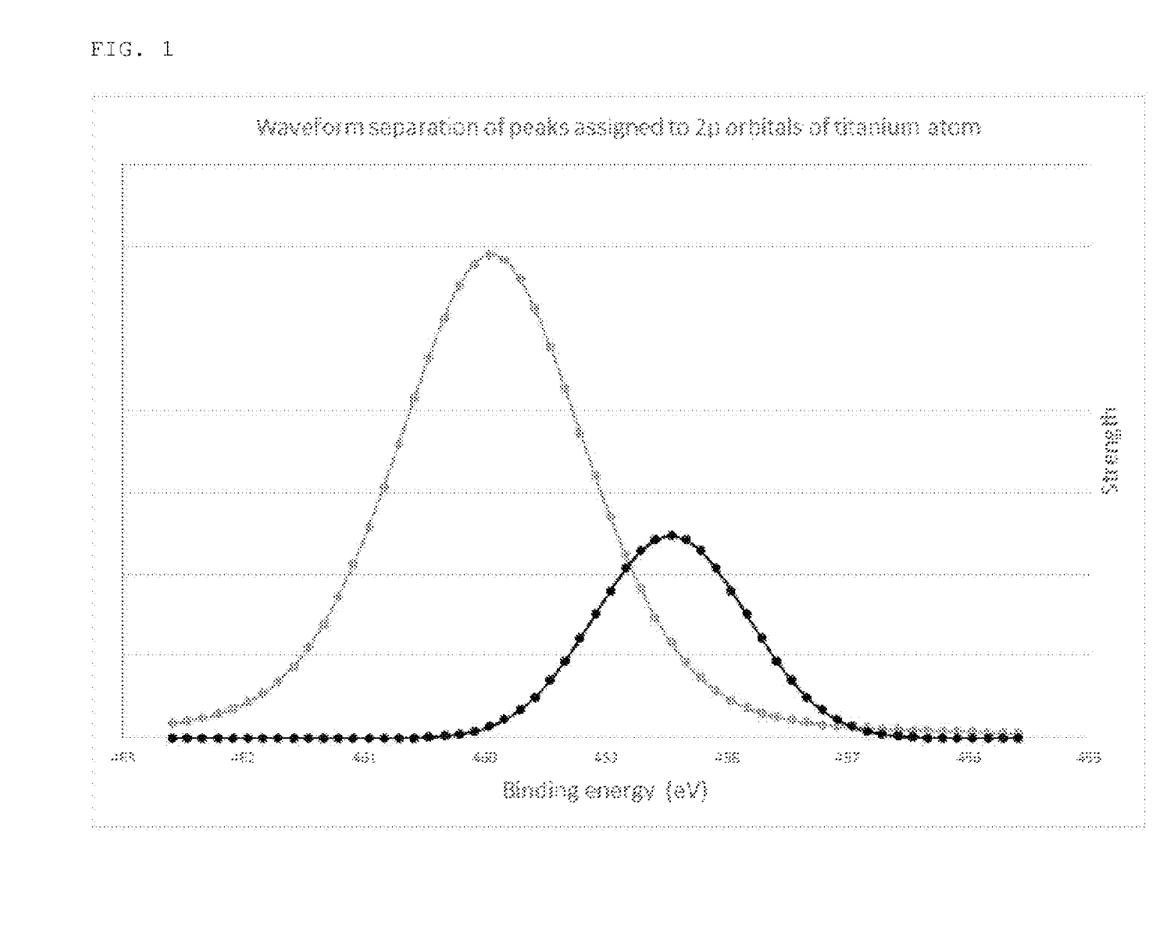
FIG. 1 shows a measurement result of X-ray photoelectron spectroscopy performed on a solid catalyst component 1 for olefin polymerization obtained in Example 1, showing a peak obtained by waveform separation of peaks assigned to the 2p orbitals of titanium atoms, and the binding energy of the peak (1) is 458.47 eV.
Figure 2:
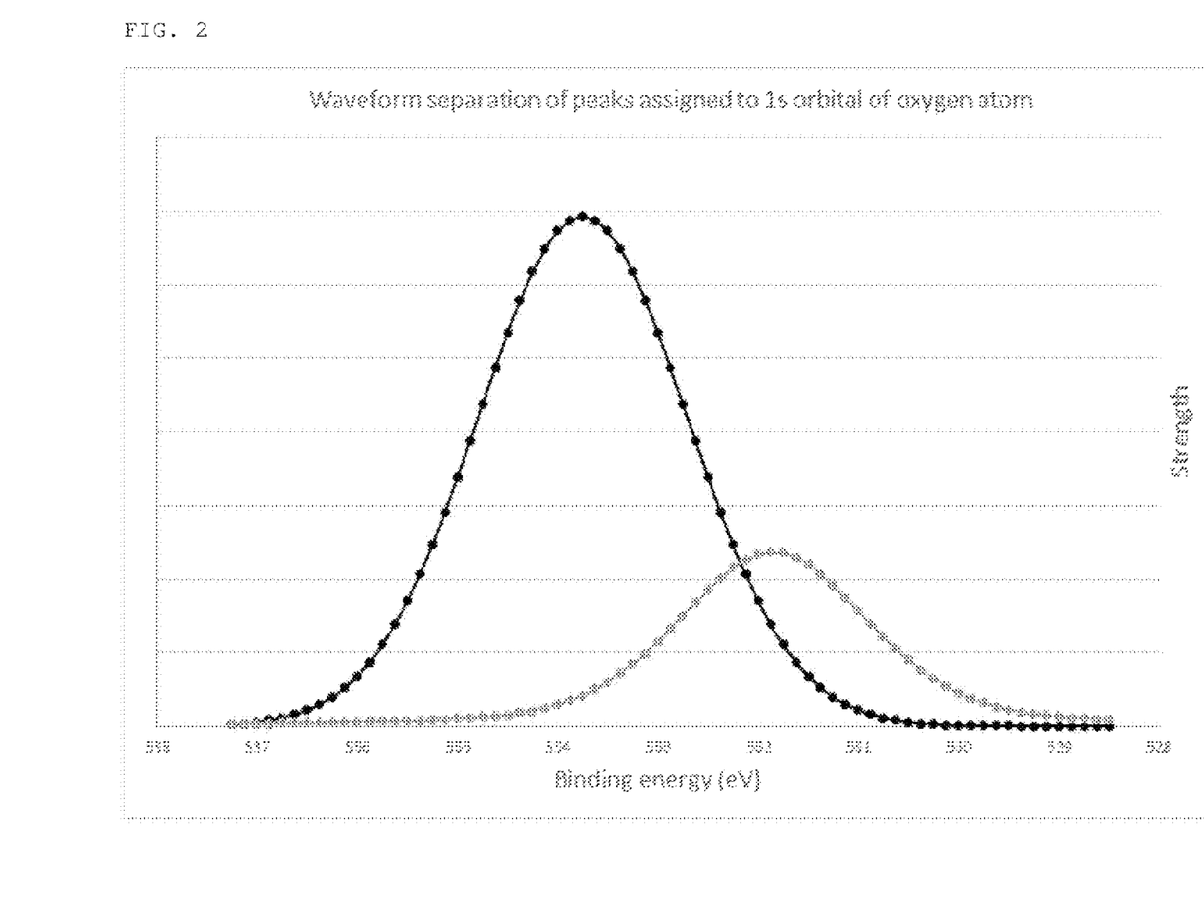
FIG. 2 is a measurement result of X-ray photoelectron spectroscopy performed on the solid catalyst component 1 for olefin polymerization obtained in Example 1, showing a peak obtained by waveform separation of peaks assigned to the Is orbital of oxygen atoms, and the binding energy of the peak (2) is 533.76 eV.

According to X-ray photoelectron spectroscopy performed on the obtained solid catalyst component 1 for olefin polymerization, the binding energy of the peak (1) obtained by waveform separation of peaks assigned to the 2p orbitals of titanium atoms was 458.47 eV (see FIG. 1), the binding energy of the peak (2) obtained by waveform separation of peaks assigned to the 1s orbital of oxygen atoms was 533.76 eV (see FIG. 2), and an absolute difference in binding energy was 75.29 eV. Table 1 shows the results.

An amount of fine powder determined from the specific absorbance of a toluene suspension of the obtained solid catalyst component 1 for olefin polymerization was 2 cm²/g. Table 1 shows the results.

Example 2

Synthesis of Solid Catalyst Component 2 for Olefin Polymerization

A solid catalyst component 2 for olefin polymerization was obtained in a similar manner to Example 1 except that conditions were changed to $n_1$: 266 rpm, $d_1$: 0.054 m, $A_1$: 0.37, $n_2$: 266 rpm, $d_2$: 0.054 m, and $A_2$: 0.37. The obtained solid catalyst component 2 for olefin polymerization had a yield of 100% based on an amount of magnesium fed. Table 1 shows the results.

Example 3

Synthesis of Solid Catalyst Component 3 for Olefin Polymerization

A solid catalyst component 3 for olefin polymerization was obtained in a similar manner to Example 1 except that conditions were changed to $n_1$: 1025 rpm, $d_1$: 0.054 m, $A_1$: 1.43, $n_2$: 1025 rpm, $d_2$: 0.054 m, and $A_2$: 1.43. The obtained solid catalyst component 3 for olefin polymerization had a yield of 80% based on an amount of magnesium fed. Table 1 shows the results.

Comparative Example 1

Synthesis of Solid Catalyst Component C1 for Olefin Polymerization

A solid catalyst component C1 for olefin polymerization was obtained in a similar manner to Example 1 except that conditions were changed to $n_1$: 190 rpm, $d_1$: 0.054 m, $A_1$: 0.26, $n_2$: 190 rpm, $d_2$: 0.054 m, and $A_2$: 0.26. The obtained solid catalyst component C1 for olefin polymerization had a yield of 60% based on an amount of magnesium fed. Table 1 shows the results.

Comparative Example 2

Synthesis of Solid Catalyst Component C2 for Olefin Polymerization

A solid catalyst component C2 for olefin polymerization was obtained in a similar manner to Example 1 except that conditions were changed to $n_1$: 1220 rpm, $d_1$: 0.054 m, $A_1$: 1.70, $n_2$: 1220 μm, $d_2$: 0.054 m, and $A_2$: 1.70. The obtained solid catalyst component C2 for olefin polymerization had a yield of 90% based on an amount of magnesium fed. Table 1 shows the results.

TABLE 1

| | $A_1$ | $A_2$ | Peak (1) binding energy (eV) | Peak (2) binding energy (eV) | Absolute difference in binding energy (eV) | Amount of fine powder (cm²/g) |
|---|---|---|---|---|---|---|
| Example 1 | 0.32 | 0.32 | 458.47 | 533.76 | 75.29 | 2 |
| Example 2 | 0.37 | 0.37 | 458.51 | 533.63 | 75.12 | 1 |
| Example 3 | 1.43 | 1.43 | 458.18 | 533.51 | 75.33 | 2 |
| Comparative Example 1 | 0.26 | 0.26 | 458.13 | 533.50 | 75.37 | 7 |
| Comparative Example 2 | 1.70 | 1.70 | 458.05 | 533.76 | 75.71 | 3 |

Example 4

Synthesis of Precursor 4 of Catalyst Component for Olefin Polymerization

Step (I): The inside of a stainless steel reactor equipped with a stirrer was displaced by nitrogen gas. Then, toluene (52.8 L) and titanium tetrachloride (33.3 L) were put in the reactor and stirred to obtain a toluene solution containing titanium tetrachloride. Then, after the temperature inside the reactor was adjusted to 0° C. or lower, magnesium diethoxide (11 kg) was put in the reactor in six additions on a 72-minute basis while being stirred under the conditions of $n_1$: 100 rpm, $d_1$: 0.36 m, and $A_1$: 0.70. Then, the temperature inside the reactor was maintained for 120 minutes, being controlled not to exceed 2° C. Then, ethyl 2-ethoxymethyl-3,3-dimethylbutanoate (0.77 kg) was put in the reactor, and the temperature inside the reactor was maintained at 10° C. or lower for 90 minutes. The resulting slurry was subjected to solid-liquid separation to obtain a solid. The solid obtained was washed with toluene at room temperature. The solid obtained was dried to obtain a solid product (precursor 4 of a solid catalyst component for olefin polymerization). The solid product had a mechanical strength of 4.4 MPa. Table 2 shows the results.

Example 5

Synthesis of Precursor 5 of Catalyst Component for Olefin Polymerization

Step (I):

The inside of a stainless steel reactor equipped with a stirrer was displaced by nitrogen gas. Then, toluene (52.8 L) and titanium tetrachloride (33.3 L) were put in the reactor and stirred to obtain a toluene solution containing titanium tetrachloride. Then, after the temperature inside the reactor was adjusted to 0° C. or lower, magnesium diethoxide (11 kg) was put in the reactor in six additions on a 72-minute basis while being stirred under the conditions of $n_1$: 140 rpm, $d_1$: 0.36 m, and $A_1$: 0.98. Then, the temperature inside the reactor was maintained for 120 minutes, being controlled not to exceed 2° C. The resulting slurry was subjected to solid-liquid separation to obtain a solid. The solid obtained was washed with toluene at room temperature. The solid obtained was dried to obtain a solid product (precursor 5 of a solid catalyst component for olefin polymerization).

Example 6

Synthesis of Precursor 6 of Catalyst Component for Olefin Polymerization

Step (I):

The inside of a stainless steel reactor equipped with a stirrer was displaced by nitrogen gas. Then, toluene (52.8 L) and titanium tetrachloride (33.3 L) were put in the reactor and stirred to obtain a toluene solution containing titanium tetrachloride. Then, after the temperature inside the reactor was adjusted to 0° C. or lower, magnesium diethoxide (11 kg) was put in the reactor in six additions on a 72-minute basis while being stirred under the conditions of $n_1$: 100 rpm, $d_1$: 0.36 m, and $A_1$: 0.70. Then, the temperature inside the reactor was maintained for 210 minutes, being controlled not to exceed 3° C. Then, ethyl 2-ethoxymethyl-3,3-dimethylbutanoate (0.76 kg) was put in the reactor, and the temperature inside the reactor was maintained at 12° C. or lower for 2 hours. The resulting slurry was subjected to solid-liquid separation to obtain a solid. The solid obtained was washed with toluene at room temperature. The solid obtained was dried to obtain a solid product (precursor 6 of a solid catalyst component for olefin polymerization). The solid product had a mechanical strength of 6.8 MPa. Table 2 shows the results.

Example 7

Synthesis of Precursor 7 of Catalyst Component for Olefin Polymerization

Step (I):

The inside of a stainless steel reactor equipped with a stirrer was displaced by nitrogen gas. Then, toluene (52.8 L) and titanium tetrachloride (33.3 L) were put in the reactor and stirred to obtain a toluene solution containing titanium tetrachloride. Then, after the temperature inside the reactor was adjusted to 0° C. or lower, magnesium diethoxide (11 kg) was put in the reactor in six additions on a 72-minute basis while being stirred under the conditions of $n_1$: 72 rpm, $d_1$: 0.36 m, and $A_1$: 0.50. Then, the temperature inside the reactor was maintained for 110 minutes, being controlled not to exceed 3° C. Then, ethyl 2-ethoxymethyl-3,3-dimethylbutanoate (0.76 kg) was put in the reactor, and the temperature inside the reactor was maintained at 11° C. or lower for 2 hours. The resulting slurry was subjected to solid-liquid separation to obtain a solid. The solid obtained was washed with toluene at room temperature. The solid obtained was dried to obtain a solid product (precursor 7 of a solid catalyst component for olefin polymerization). The solid product had a mechanical strength of 5.4 MPa. Table 2 shows the results.

TABLE 2

|  | $A_1$ | Mechanical strength (MPa) |
| --- | --- | --- |
| Example 4 | 0.70 | 4.4 |
| Example 5 | 0.98 | 3.9 |
| Example 6 | 0.70 | 6.8 |
| Example 7 | 0.50 | 5.4 |

The present disclosure can be used in the production of olefin polymers.

What is claimed is:

1. A method for producing a solid catalyst component for olefin polymerization containing a titanium atom, a magnesium atom, a halogen atom, and an internal electron donor, the method comprising:

Step (I) of bringing a solution containing a titanium halide compound and a solvent into contact with metallic magnesium or a magnesium compound to obtain a slurry containing a solid product, wherein $A_1$ calculated by the following Formula (1) is 0.3 to 1.6 in Step (I):

$$A_1 = n_1/60 \times d_1^{0.85} \quad (1)$$

where $n_1$ represents revolutions per minute (rpm) of a stirrer blade, and di represents a blade diameter (m) of the stirrer blade; and wherein the solid catalyst component for olefin polymerization has an absolute difference in binding energy of 73.50 to 75.35 eV between a peak (1) with the binding energy of 457.00 to 459.00 eV and a peak (2) with the binding energy of 532.50 to 534.50 eV, the peak (1) and the peak (2) are within peak components measured by X-ray photoelectron spectroscopy, the peak (1) is obtained by waveform separation of peaks assigned to the 2p orbitals of the titanium atom, and the peak (2) is obtained by waveform separation of peaks assigned to the 1s orbital of an oxygen atom.

2. The method for producing a solid catalyst component for olefin polymerization according to claim 1, further comprising Step (II) of adding the internal electron donor to the slurry containing the solid product obtained in Step (I).

3. The method for producing a solid catalyst component for olefin polymerization according to claim 2, wherein $A_2$ calculated by the following formula (2) is 0.3 to 1.6 in Step (II):

$$A_2 = n_2/60 \times d_2^{0.85} \quad (2)$$

where $n_2$ represents revolutions per minute (rpm) of the stirrer blade, and $d_2$ represents a blade diameter (m) of the stirrer blade.

4. The method for producing a solid catalyst component for olefin polymerization according to claim 1, wherein the absolute difference in binding energy is 75.05 to 75.35 eV.

5. The method for producing a solid catalyst component for olefin polymerization according to claim 1, wherein the internal electron donor is at least one selected from the group consisting of monoester compounds, aliphatic dicarboxylic acid ester compounds, aromatic dicarboxylic acid ester compounds, diol diester compounds, β-alkoxy ester compounds, and ether compounds.

6. The method for producing a solid catalyst component for olefin polymerization according to claim 1, wherein the magnesium compound is a magnesium dialkoxide.

7. The method for producing a solid catalyst component for olefin polymerization according to claim 6, wherein the magnesium dialkoxide is magnesium diethoxide.

* * * * *